(12) United States Patent
Molyneux

(10) Patent No.: US 8,120,655 B1
(45) Date of Patent: Feb. 21, 2012

(54) INTERACTIVE THEATRICAL PERFORMANCE

(75) Inventor: Timothy B. Molyneux, Nashville, TN (US)

(73) Assignee: Molyneux Entertainment Company, Nashville, TN (US)

( * ) Notice: Subject to any disclaimer, the term of this patent is extended or adjusted under 35 U.S.C. 154(b) by 1646 days.

(21) Appl. No.: 11/000,830

(22) Filed: Dec. 1, 2004

(51) Int. Cl.
*H04N 7/18* (2006.01)

(52) U.S. Cl. .......................................... 348/143; 348/159

(58) Field of Classification Search ........... 348/142–160
See application file for complete search history.

(56) References Cited

U.S. PATENT DOCUMENTS

| | | | |
|---|---|---|---|
| 5,448,291 A * | 9/1995 | Wickline | 348/159 |
| 5,594,498 A * | 1/1997 | Fraley | 348/158 |
| 5,625,410 A * | 4/1997 | Washino et al. | 348/154 |
| 6,386,985 B1 * | 5/2002 | Rackham | 472/75 |
| 6,937,295 B2 * | 8/2005 | Islam et al. | 348/722 |
| 2001/0032127 A1 * | 10/2001 | Lewis | 705/14 |

* cited by examiner

*Primary Examiner* — Andy Rao
(74) *Attorney, Agent, or Firm* — Waddey & Paterson, P.C.; James R. Cartiglia

(57) ABSTRACT

A theatrical performance for relaying data from at least one performer to at least one member of the audience, including a processor; at least one data collector positioned on the at least one performer and remotely connected to the processor; and at least one display device remotely connected to the processor to display processed data from the processor.

20 Claims, 1 Drawing Sheet

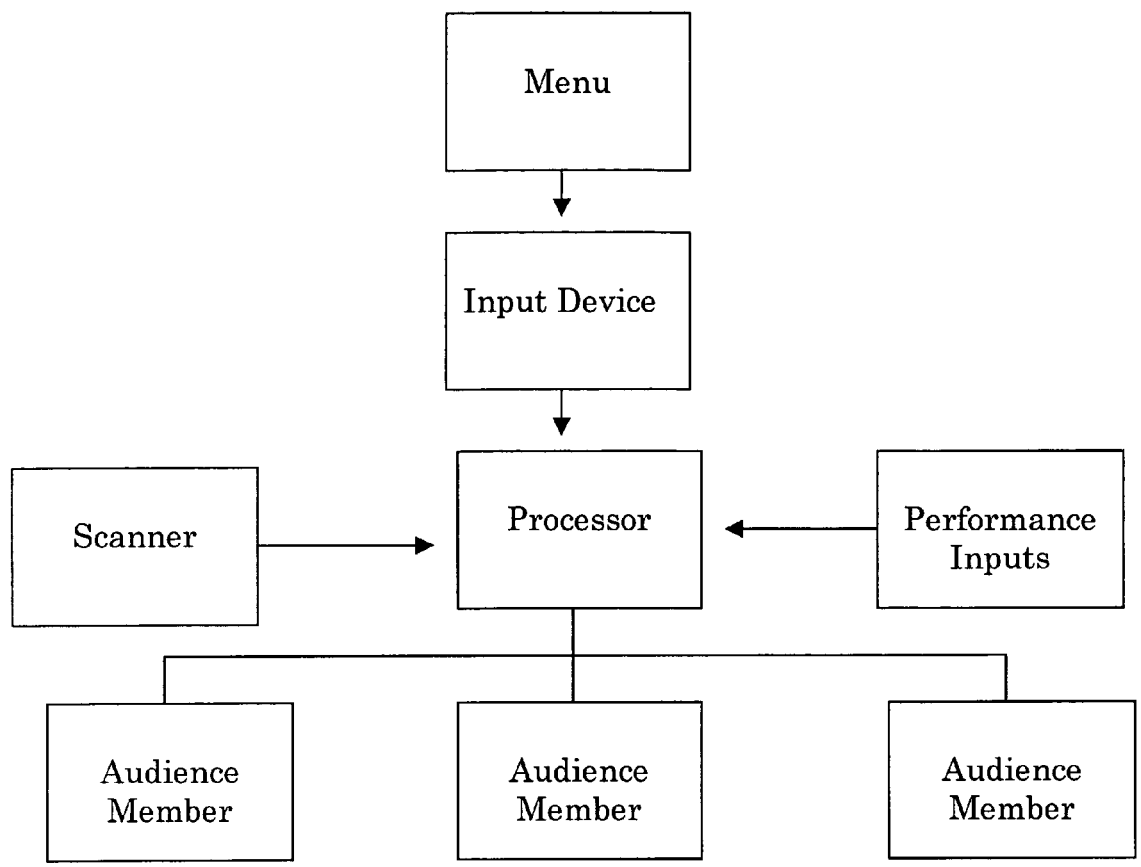

INTERACTIVE THEATRICAL PERFORMANCE

TECHNICAL FIELD

The present invention relates to a theatrical performance which makes use of "virtual reality-type" concepts to provide an interactive and altered perspective view for audience members. By "virtual reality" is meant an altered sensory experience which differs from that which would otherwise be experienced. The inventive system permits a customizable experience for individual members of the audience.

BACKGROUND OF THE ART

Live theatrical performances generally involve one or more actors or performers on a stage which faces or is surrounded by an audience comprising of individual audience members. The juxtaposition of stage and audience defines the perspective experienced by each audience member through the so-called "fourth wall", the imaginary wall between the stage and the audience, which the performers on stage treat as an actual divider to give the audience the impression of viewing action in a closed room. Individual audience members experience the theatrical performance based on their individual view of the performers on the stage through this fourth wall. Even in productions where the fourth wall is breached such as by performers directly addressing the audience or venturing out into audience areas, an audience member's positioning still determines his or her view of the proceedings.

Likewise, an individual audience member's experience is limited by selections made by the producers, director, or other creative individuals involved in the production. In other words, certain scenery and costumes are selected and other aspects of the production's appearance and presentation are selected without the control or input of individual audience members. Moreover, these selections are made for the audience as a whole and not customized for individual audience members. Thus, each member of the audience is required to view the same stylistic elements as every other audience member regardless of personal preferences or creative notions.

Although interactive productions have been staged where audience members vote or otherwise select from among options with respect to scenes and/or endings, the choices are made by the audience as a whole and not customizable by individual audience members. Consequently, if the audience as a whole decides a scene should proceed in a certain manner in such an interactive production, each audience member is thereby obliged to experience that particular manner of proceeding. Thus, while nominally interactive, individual choice falls prey to the group's decisions.

What is desired, therefore, is an interactive theatrical performance whereby individual audience members can select and/or alter their respective viewpoints or experience during the production. Such an interactive theatrical performance is provided herein.

SUMMARY OF THE INVENTION

The present invention provides an interactive theatrical performance where each audience member is provided with one or more "virtual reality" devices which function to permit a customizable theatrical experience for that individual audience member and thereby combine the features of a live theatrical experience with those of virtual reality games, etc. Exemplary of such devices are virtual reality goggles, which block out all light from outside the goggles and project an image to the wearer which substitutes the projected image for the actual environment he or she is in, thereby creating a "virtual" reality. Another such device is one or a pair of virtual reality gloves, which can provide sensory details to the wearer, such as heat and cold. In one embodiment of the inventive system, each of the performers during the performance can have on his or her person a miniature broadcast camera such that individual audience members can select the perspective offered by individual performers. In other words, by using virtual reality goggles, an audience member can select a perspective of Actor A and, thus, view the action through the "eyes" of Actor A by viewing through the camera worn by Actor A. Likewise, another audience member can view the performance through the perspective of Actor B, and so on, so that, indeed, audience members sitting next to each other can actually be viewing the performance from entirely different perspectives. Moreover, an audience member can be permitted to switch during the performance such that he or she is thereafter viewing the performance from a different actor's prospective. In addition, cameras can be positioned at different locations on or around the stage, such that audience members can view the performance from these different static locations, rather than through the perspective of individual performers.

This can be accomplished through feeding the signals from the respective cameras mounted on the performers through a processor that directs the signal to individual audience members in response to selections made by the audience member. The signals can be either wirelessly transmitted or through hard-wired connections on to processors or receivers at audience seats. An audience member can either make a selection upon entering the theater such that the particular selection made is associated with the audience member's seat number and the appropriate signal sent to the virtual reality goggles associated with that seat number. More preferably, a selection device can be available at each seat such that an audience member can select any perspective performer at various points during the performance. The selection is electronically transmitted to the processor (again either wirelessly or through hard-wired connection), which thereby sends the appropriate signal (or perspective) to the selecting audience member. Alternatively, the respective selections available to audience member can be made through an internet site which can be accessed by, e.g., ticket holders, prior to entering the theater.

In another embodiment of the invention, which can be either substituted for or in addition to the earlier described embodiment, the view provided to an audience member can be customized as to scenery, costuming, or other stylistic elements of the productions. In other words, the theatrical performance can be performed in front of blank screens, or so called "blue screens" or "green screens" such that different scenery elements can be displayed on the screens when viewed through the virtual reality goggles.

Thus, one audience member can perhaps select as the location for the performance a castle, whereas another audience member can select, for instance, a garden. For the first audience member, his or her virtual reality goggles can then display castle scenery displayed on the background screens behind the performers, whereas the second audience member can have garden scenery displayed. Again, audience members sitting next to each other can view the live performance in entirely different settings. Moreover, the performers can be wearing costumes having sensors or other devices which permit the display of different elements thereon when viewed through virtual reality goggles, so that the costuming can be individually selected by audience members and customized such that the appropriate costumes are displayed based on the scenery selected by the audience member.

In a further embodiment, audience member's features can be scanned into a processor, such as when the audience member enters the theater. That audience member's features can then be displayed on one or more of the performers during the performance, such that the audience member is viewing him- or herself in one of the performers' roles. When an audience member is viewing the performance from the perspective of a different performer, he or she can be watching him or herself displayed on a first performer. Again, this can be customized for individual audience members such that each audience member is viewing him- or herself on stage.

Other virtual reality elements can also be included within the audiences' experiences. For instance, audience members can also wear virtual reality gloves or other elements of clothing which can provide sensory experiences such as heat, cold, etc., in response to experiences felt by individual performers. In this way, if an actor picks up a cold glass, the cold sensation can be provided to individual audience members through the virtual reality gloves; if an actor touches a hot object, heat can be experienced by individual audience members.

Other "virtual reality" effects can also be included such that blowers or water sprayers, etc., can be positioned near each seat or over the audience as a whole to duplicate environmental conditions supposedly experienced by the performers during the performance. Again, if one of the performers is supposedly experiencing a breeze, individual audience members associating themselves with that actor can also experience a breeze if a blower is associated with individual seats, whereas nearby audience members would not experience the same breeze.

Accordingly, it is an object of the present invention to provide an interactive theatrical performance.

It is another object of the present invention to provide a theatrical performance which can be customized according to audience members' individual desires.

It is yet another object of the present invention to provide an interactive theatrical performance where individual audience members can view the performance through the perspective of individual performers during the performance.

It is still another object of the present invention to provide an interactive theatrical performance whereby individual audience members can select stylistic elements of the performance independent of the selections of other audience members.

It is a further object of the present invention to provide an interactive theatrical performance whereby individual audience members can experience environmental and/or sensory elements of the performance assertedly experienced by individual performers, or from different locations, selected on an independent and customizable basis.

These objects and others which will be apparent to the skilled artisan upon review of the following description can be accomplished by providing a theatrical performance for relaying data from at least one performer to the audience, which includes a processor, at least one data collector positioned on the at least one performer and remotely connected to the processor; and at least one display device, such as a video or audio display device, remotely connected to the processor to display processed data from the processor. Advantageously, the data collector obtains data substantially similar to data perceived by the at least one performer, and the processor receives the data from the at least one data collector and transmits the data to the at least one display device. The processed data is displayed to one or more of the members of the audience, preferably in real time (i.e., relatively instantaneously), such as by a plurality of secondary processors remotely connected to the processor to modify the collected audio and visual data.

In another embodiment of the invention, the audio and visual data and the additional audio and visual data are processed into a plurality of performance sets of data during the theatrical performance; and each audience member (spectator) can separately experience each performance set of data. Preferably, each spectator can independently select one of the performance sets of data to experience; more preferably, each spectator programs one of the individual processors to individually modify the collected audio and visual data.

It is to be understood that both the foregoing general description and the following detailed description provide embodiments of the invention and are intended to provide an overview or framework of understanding the nature and character of the invention as it is claimed. The accompanying drawing is included to provide a further understanding of the invention and is incorporated in and constitutes a part of the specification. The drawing illustrates an embodiment of the invention, and together with the description, serves to describe the principles and operations of the invention.

BRIEF DESCRIPTION OF THE DRAWING

FIG. 1 is a flowchart illustrating the operation of one embodiment of the present invention.

DETAILED DESCRIPTION OF THE PREFERRED EMBODIMENT

The theatrical performance around which the invention of the above-captioned application can be produced can be any type of theatrical performance, including those ranging from dramatic play through comedy through musical. Indeed, the inventive system can create an entirely new class of theatrical performance. Most preferably, the performance is a dramatic play or comedy. In practice, a menu of selections is made available to audience members as illustrated as 20 in FIG. 1. The menu can be electronic or on paper and provides the selections available to each audience member, such as from which actor the audience member's perspective is to be taken, through scenery or costuming selections. The menu can be available upon entry into the theater or at each individual seat. In addition, an input device designated 30 is used to input each individual audience member's selection into a processor 40. Input device 30 can be actuated by a host or hostess or by the individual audience member him- or herself. Indeed menu 20 and input device 30 can be combined into one unit with a touch pad or other similar actuator to permit an audience member to enter his or her choices. In a preferred embodiment, a scanner 50 can be used to input characteristics of individual audience members such as facial features, etc., and fed into processor 40. Most preferably, scanner 50 is present at the entrance of the theater in which the performance is to be held, with individual audience members having the required features scanned into scanner 50 as he or she enters.

Selections from input device 30 and, when employed, data from scanner 50, are associated with each individual audience member such as, for instance, via ticket seat number, and fed into processor 50. Processor 40 also obtains performance inputs which can be data from cameras worn by individual performers, static cameras situated about the stage or other areas of the theater, environmental cues experienced by individual performers, sensory experiences from individual performers, etc. Processor 40 then provides the appropriate data to individual audience members.

Individual signals can be sent to audience members through the use of a multiplexer associated with processor 40. Most preferably, each individual audience member has a processor at his or her seat (not shown) which obtains a signal from processor 40 and communicates the selections made by each individual audience member by that individual audience member, scanned in characteristics and performance inputs, to provide the selected experience to individual audience member 62, 64, 66, etc.

More particularly, if audience member 62 selected a castle scene, had his or her physical characteristics scanned in and assigned to actor A and wished to view the performance from the perspective of actor B, then each of those parameters can be provided to virtual reality goggles associated with the seat at which audience member 62 is seated. Thus, the audience member 62 can assume the view of performer B and observe him or herself in the role of performer A in a castle scene through virtual reality goggles.

Other virtual reality effects can also be communicated to audience member 62 from processor 40 (such as through an individual processor located at the seat of audience member 62 such as hot or cold inputs through virtual reality gloves, breezes, rain, etc. These individual effects can be repeated for each audience member 62, 64, 66, etc., on an individual and customizable basis.

Thus, for the first time, a truly interactive and independent customizable theatrical performance can be provided where each audience member can select elements of the production to be observed including perspective, scenery, costuming, or other aspects of the production independent of other audience members. If menu 20 and input device 30 are located at audience member's seats, these choices can even be altered and amended during the performance.

The above description is intended to enable to person skilled in the art to practice the invention. It is not intended to detail or alter possible variations any modifications that would become apparent to a skilled worker upon reading the description. It is intended, however, that all such modifications and variations be included within the scope of the invention that is defined by the following claims. The claims are intended to cover the indicated elements and steps in any arrangement or sequence that is effective to meet the objectives intended for the invention, unless the context specifically indicates the contrary.

The invention claimed is:

1. An interactive system for providing a live customized theatrical performance, the system comprising:
   a processor; and
   at least one virtual reality device associated with each spectator of the live theatrical performance, each virtual reality device coupled to the processor to independently receive real time virtual reality sensory effects projected from the processor in response to one or more parameters selected by the associated spectator,
   wherein selectable parameters further comprise a visual perspective for the spectator, costumes associated with each performer, and background scenery elements.

2. The system of claim 1, further comprising
   at least one data collector dynamically positioned on each of a plurality of performers and remotely connected to the processor, and
   at least one data collector statically positioned for viewing the plurality of performers and remotely connected to the processor,
   wherein the processor is configured to provide a virtual reality sensory effect associated with one of said dynamically positioned and statically positioned data collectors to a virtual reality device in response to an associated visual perspective parameter selection.

3. The system of claim 2, the selectable parameters further comprising physical features for at least one performer.

4. The system of claim 3, the physical features for the at least one performer selectable by the associated spectator from among various options including the physical features of the associated spectator.

5. The system of claim 2, the selectable parameters further comprising environmental effects associated with at least one performer.

6. The system of claim 5, the at least one virtual reality device further comprising at least one virtual reality glove, the environmental effects further comprising temperature effects projected to the at least one glove.

7. An interactive system for customizing a live theatrical performance, the system comprising:
   an input device configured to receive one or more performance parameters associated with a spectator of the performance;
   one or more real time data collectors associated with a performer in said theatrical performance;
   one or more virtual reality devices associated with the spectator; and
   a processor configured to
     receive the performance parameters from the input device and real time performance data from the one or more real time data collectors,
     generate an individually customized real time theatrical performance based on the performance parameters superimposed with the real time performance data, and
     provide the customized real time theatrical performance to the one or more virtual reality devices for real time presentation to the spectator.

8. The system of claim 7, wherein the input device is configured to receive one or more performance parameters selected by the spectator prior to the performance.

9. The system of claim 7, wherein the input device is configured to receive one or more performance parameters selected by the spectator in real time during the performance.

10. The system of claim 7, wherein the input device is configured to receive one or more performance parameters selected by the spectator prior to the performance and further configured to receive one or more performance parameters selected by the spectator in real time during the performance to supplement or amend the performance parameters selected prior to the performance.

11. The system of claim 7, the performance parameters selectable by the spectator and comprising one or more of a visual perspective for the spectator, costumes associated with each performer, and background scenery elements.

12. The system of claim 11, further comprising a scanner wherein physical features of the spectator may be scanned prior to the theatrical performance,
   the processor further configured to generate the customized real time theatrical performance based on the scanned physical features of the spectator,
   wherein the customized real time theatrical performance comprises a perspective view for the spectator of the scanned physical features of the spectator superimposed on a performer in real time.

13. The system of claim 7, the real time performance data collected from the one or more data collectors further comprising one or more of a perspective view, an environmental cue or a sensory experience from the individual performer associated with the one or more data collectors.

14. A method of providing a customized theatrical performance to individual audience members in real time, the method comprising:
receiving at a processor one or more performance parameters associated with an individual audience member, wherein the performance parameters are selectable by the individual audience member from a menu comprising one or more of a performer from which a visual perspective for the individual audience member is to be taken, scenery selections, costume selections and physical characteristics of one or more performers in the theatrical performance;
receiving at the processor performance data from one or more real time performance data collectors remotely coupled to the processor;
generating at the processor a theatrical performance customized to the individual audience member based on the performance parameters and the performance data; and
providing in real time virtual reality data to one or more virtual reality display devices associated with the individual audience member, the virtual reality data corresponding to the generated customized theatrical performance.

15. The method of claim 14, wherein the step of receiving performance parameters further comprises receiving at a processor one or more performance parameters selected by an individual audience member prior to the theatrical performance.

16. The method of claim 14, wherein the step of receiving performance parameters further comprises receiving at a processor one or more performance parameters selected by an individual audience member in real time during the theatrical performance.

17. The method of claim 14, further comprising providing virtual reality environmental effects to the individual audience member, said virtual reality environmental effects further comprising environmental conditions corresponding to the generated customized theatrical performance in real time.

18. The method of claim 17, the virtual reality environmental effects provided by virtual reality apparel, an air blower or a water sprayer positioned relative to the associated individual audience member.

19. The method of claim 14, wherein the one or more real time performance data collectors are positioned on one or more performers in the theatrical performance.

20. The method of claim 14, further comprising the step of scanning physical characteristics of the individual audience member upon entry by said audience member into the theater in which the theatrical performance is held,
wherein the selectable performance parameters further comprise the physical characteristics of the individual audience member substituted for the physical characteristics of one or more performers in the theatrical performance.

* * * * *